United States Patent Office 2,820,771
Patented Jan. 21, 1958

2,820,771

SECONDARY-2-N-OCTYL PRIMARY-N-HEPTYL PHTHALATE AND SYNTHETIC PLASTICS CONTAINING SAME

André Henri Passedouet, Bezons, France, assignor to Consortium de Produits Chimiques et de Synthese, Bezons, France No Drawing. Application June 9, 1954
Serial No. 435,629

3 Claims. (Cl. 260—31.8)

This invention relates to new esters having plasticising properties.

It is known that the plastics obtained by polymerisation of vinyl chloride by itself and the co-polymers of vinyl chloride, such as the acetate chloride, require plasticisers to be incorporated with them for a large proportion of their applications. By varying the proportion of plasticiser and vinyl resin it is possible to obtain a whole series of plastic masses having to a varying degree the properties of flexibility, pliability and elasticity. Alkyl phthalates are among the plasticisers most used.

These plasticisers are obtained from phthalic acid by esterification with aliphatic or arylalkyl alcohols.

Butyl, amyl and hexyl phthalates are good plasticisers for polyvinyl chloride and its copolymers; nevertheless these esters have too high a volatility and it is preferred to use alkyl phthalates of higher molecular weight, such as octyl and nonyl phthalate.

When the alkyl chain contains more than 10 carbon atoms the alkyl phthalates are only partially compatible with polyvinyl chloride and its copolymers, and their melting point is not low enough to make plastic compositions having a sufficient flexibility at temperatures much below 0° C.

All things considered the alcohols generally used contain between 4 and 10 carbon atoms. For the manufacture of phthalates of this type the sources of aliphatic alcohols are varied and they are generally made from coal or petroleum.

One vegetable raw material for the manufacture of plasticisers and plastic bodies is castor oil. This can be split by known methods in two principal different ways: The first gives sebacic acid and n-octanol-2; the other gives undecylenic acid and n-heptanal or oenanthol. The oenanthol can readily be hydrogenated by known methods to give primary n-heptyl alcohol.

Thus primary n-heptyl and secondary 2-n-octyl alcohols can be obtained in industrial quantities by simple processes independently of sources of petroleum or coal. In fact di-n-octanol-2 phthalates and di-primary-n-heptyl phthalates are known and used industrially.

The present invention provides the hitherto unknown mixed ester secondary-2-n-octyl-primary n heptyl phthalate.

This phthalate is an excellent plasticiser for vinyl resins. As compared to di-primary-n-heptyl phthalate it has the advantage of being less volatile.

As compared to di-secondary-2-n-octyl phthalate it also has certain advantages: It is substantially less-viscous and consequently has a better plasticising effect. Moreover the esterification of secondary-2-n-octyl alcohol with phthalic anhydride is accompanied by dehydration of this secondary alcohol to form an ethylenic hydrocarbon which reduces the yield:

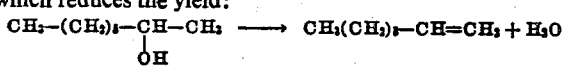

Now it has been found that this dehydration takes place more particularly in the course of the esterification of the second acid group of phthalic anhydride; the esterification of the first acid group in fact corresponds to a simple addition without elimination of water and can be carried out under milder conditions which obviate the dehydration of the capryl alcohol.

The present invention provides a process for the preparation of the mixed ester secondary-2-n-octyl, primary n-hexyl phthalate which may be represented by the following reaction scheme:

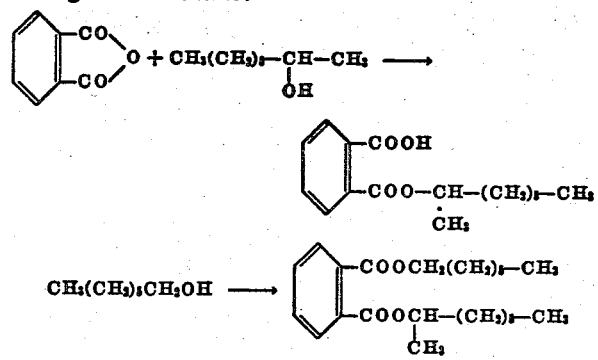

It will be seen that the ester is made in accordance with the invention in two stages, which ensures an excellent yield of a product which is only slightly discoloured; in the first stage 1 mol of phthalic anhydride is reacted with 1 mol of secondary-2-n-octyl alcohol, then 1 mol of primary n-heptyl alcohol is introduced into the reaction in the presence of an insoluble solvent which serves to entrain the water removed during the esterification. The reaction is advantageously catalysed by a small quantity of a strong acid such as sulphuric acid or an aryl sulphonic acid.

When an attempt is made to esterify phthalic anhydride directly with a mixture of secondary-2-n-octyl alcohol and primary n-heptyl alcohol, the same difficulties are encountered as in the production of di-secondary octyl phthalate and a part of the secondary octyl alcohol is dehydrated and the acid number of the mixture remains high because the secondary octyl alcohol has not been wholly utilised.

These facts are illustrated by the following examples:

Example 1

The following mixture is heated in a receiver provided with apparatus for decanting the condensed vapours:

296 parts of phthalic anhydride
310 parts of secondary-2-n-octyl alcohol
237 parts of primary n-heptyl alcohol
4 parts of sulphuric acid
500 volumes of toluene The mixture is heated to 125–130° C. for 10 hours while the acid number and the volume of water azeotropically entrained by the toluene are observed. At the end of 8 hours the acid number of the mixture remains stationary at 11.5. The water liberated at the end of 10 hours is 45 volumes (against the theoretical volume of 36). A part of the secondary octyl alcohol has then been dehydrated and the esterification can progress no further in spite of the molecular excess of this alcohol.

Example 2

Under the same operation conditions as in Example 1, 296 parts of phthalic anhydride
310 parts of secondary-2-n-octyl alcohol
250 volumes of toluene
are reacted for 1½ hours to 125–128° C. Secondary-2-n-octyl phthalate half ester is thus formed.

237 parts of primary n-heptyl alcohol
250 volumes of toluene
4 parts of sulphuric acid are then added. The mixture is then heated to 125–130° C. for four hours. By this time the acid number has fallen to 4 and the reaction mixture is markedly less coloured than in Example 1.

The ester is then washed with 4 parts of sodium carbonate in 250 volumes of water so as to neutralise it, the liquid is decanted, washed with water, and the toluene and alcohols are driven off in vacuo. A neutral secondary-2-octyl heptyl phthalate is obtained in a yield of 94.5%.

In fact the reaction product obtained according to Example 1 is not only less valuable as regards yield and quality but it corresponds to a mixture of di-secondary-2-octyl phthalate, di-primary n-heptyl phthalate and secondary octyl heptyl phthalate. The process of Example 2 gives secondary-2-octyl primary n-heptyl phthalate alone. This has the following characteristics:

Boiling point under 6 mm./Hg _____ 219–220° C.
Density at 20° C _____ 0.982
Viscosity _____ 52 centipoises at 20° C.

It is compatible with the following plastics: polyvinyl chloride, polyvinylidene chloride, a copolymer of vinyl chloride and vinyl acetate, nitrocellulose, polymethacrylate, polystyrene and alkyd resins.

*Example 3*

64 parts of polyvinyl chloride
32 parts of plasticiser ⎫
1 part of lead stearate ⎬ stabilisers
3 parts of lead silicate ⎭ are mixed in a mixer, and then passed upwards through an extruder.

The plastic composition thus produced is extruded and cut into test pieces 35 mm. x 25 mm. x 1 mm. These test pieces are submitted to violent shock in a chamber cooled by a mixture of alcohol and solid carbon dioxide. The temperature at which the test piece breaks instead of bending is a measure of the temperature of fragility. The figure obtained is exact and reproducible.

With test pieces obtained by observing the proportions given above, the relative temperatures of fragility obtained are as follows:

| Plasticiser | Fragility in the cold, ° C. |
|---|---|
| DOP (di-ethyl-2-hexyl phthalate) | −26 |
| Di-capryl phthalate | −25 |
| Di-n-heptyl phthalate | −29 |
| Secondary-2-octyl primary n-heptyl phthalate | −35 |

Since the fragility in the cold is a valuable measure of the plasticising effect, the above figures show the clear superiority of secondary-2-octyl primary n-heptyl phthalate as compared to closely related esters and DOP.

What I claim is:

1. The mixed phthalate ester secondary-2-n-octyl primary n-heptyl phthalate.

2. The process of plasticising synthetic plastics which comprises incorporating secondary-2-n-octyl primary n-heptyl phthalate in a synthetic plastic selected from the group consist of polyvinyl chloride, polyvinylidene chloride, a copolymer of vinyl chloride and vinyl acetate, nitrocellulose and polystyrene.

3. As a new composition of matter, a synthetic plastic selected from the group consisting of polyvinyl chloride, polyvinylidene chloride, a copolymer of vinyl chloride and vinyl acetate, nitrocellulose and polystyrene plasticised with secondary-2-n-octyl primary n-heptyl phthalate.

References Cited in the file of this patent

UNITED STATES PATENTS

| 1,815,878 | Van Schaak | July 21, 1931 |
| 1,949,093 | Van Schaak | Feb. 27, 1934 |
| 2,015,088 | Reid | Sept. 24, 1935 |
| 2,325,951 | Gresham | Aug. 3, 1943 |

OTHER REFERENCES

Bennetts Concise Chemical and Technical Dictionary, page 677, published 1947, Chemical Publishing Co., Inc., Brooklyn, New York.